United States Patent
Pohl et al.

(10) Patent No.: US 12,174,038 B2
(45) Date of Patent: Dec. 24, 2024

(54) METHOD FOR CHECKING DETECTED CHANGES TO AN ENVIRONMENTAL MODEL OF A DIGITAL AREA MAP

(71) Applicant: Volkswagen Aktiengesellschaft, Wolfsburg (DE)

(72) Inventors: Romy Pohl, Hannover (DE); Kai Bröhmer, Braunschweig (DE)

(73) Assignee: VOLKSWAGEN AKTIENGESELLSCHAFT, Wolfsburg (DE)

( * ) Notice: Subject to any disclaimer, the term of this patent is extended or adjusted under 35 U.S.C. 154(b) by 23 days.

(21) Appl. No.: 17/400,650

(22) Filed: Aug. 12, 2021

(65) Prior Publication Data
US 2022/0057230 A1    Feb. 24, 2022

(30) Foreign Application Priority Data
Aug. 19, 2020  (DE) .................. 10 2020 210 515

(51) Int. Cl.
G01C 21/00     (2006.01)
G01C 21/32     (2006.01)

(52) U.S. Cl.
CPC ......... *G01C 21/3841* (2020.08); *G01C 21/32* (2013.01); *G01C 21/387* (2020.08); *G01C 21/3896* (2020.08)

(58) Field of Classification Search
None
See application file for complete search history.

(56) References Cited

U.S. PATENT DOCUMENTS

| | | | |
|---|---|---|---|
| 8,306,733 B2 | 11/2012 | Shikimachi | 701/408 |
| 8,862,384 B2 | 10/2014 | Stahlin et al. | 701/409 |
| 9,423,260 B2 | 8/2016 | Stählin | |

(Continued)

FOREIGN PATENT DOCUMENTS

| | | | | |
|---|---|---|---|---|
| CN | 106339001 A | 1/2017 | ............. | G01C 11/00 |
| CN | 109073393 A | 12/2018 | ............. | G01C 21/30 |

(Continued)

OTHER PUBLICATIONS

Machine translation of DE-102014217847-A1 (Year: 2016).*

(Continued)

*Primary Examiner* — Amelia Vorce
*Assistant Examiner* — Kyle S Park
(74) *Attorney, Agent, or Firm* — Slayden Grubert Beard PLLC

(57) ABSTRACT

A method is disclosed for checking detected changes to an environmental model of a digital area map. According to the method, a first vehicle with one or more sensors detects an environmental change from an environmental model of a digital area map. Data are transferred from the first vehicle to a central server, wherein the data include information on the detected environmental change, position data of the detected environmental change, as well as information using which the sensor quality of the one or more sensors can be detected. Depending on the sensor quality of the one or more sensors, the central server performs a plausibility check of the detected environmental change using data that are detected by one or more sensors of an additional vehicle.

16 Claims, 3 Drawing Sheets

(56) References Cited

U.S. PATENT DOCUMENTS

| | | |
|---|---|---|
| 9,600,768 B1 | 3/2017 | Ferguson |
| 10,006,772 B2 | 6/2018 | Takeuchi et al. |
| 10,755,435 B2 | 8/2020 | Mielenz et al. |
| 2005/0149259 A1 | 7/2005 | Cherveny et al. ............ 701/532 |
| 2014/0046582 A1 | 2/2014 | Tijink et al. ................... 701/412 |
| 2016/0110932 A1* | 4/2016 | Klein ................ B60W 50/0205 701/30.3 |
| 2017/0277716 A1* | 9/2017 | Giurgiu ................... G06F 16/23 |
| 2019/0051153 A1* | 2/2019 | Giurgiu ............. G01C 21/3841 |
| 2019/0114493 A1* | 4/2019 | Ewert .................... G06F 18/22 |
| 2019/0291742 A1* | 9/2019 | Leach ............... B60W 50/0205 |
| 2020/0025576 A1 | 1/2020 | Watanabe et al. |
| 2020/0043339 A1 | 2/2020 | Kozaki et al. |
| 2020/0109954 A1 | 4/2020 | Li et al. |
| 2020/0173786 A1 | 6/2020 | Viswanathan |
| 2020/0409364 A1* | 12/2020 | Agrawal ................ G07C 5/008 |

FOREIGN PATENT DOCUMENTS

| | | | |
|---|---|---|---|
| DE | 102009017731 A1 | 11/2009 | ............. G09B 29/10 |
| DE | 102010003162 A1 | 12/2010 | ............... G06T 1/00 |
| DE | 102010012877 A1 | 9/2011 | ............. G09B 29/10 |
| DE | 102014217847 A1 * | 3/2016 | ............. G01C 21/28 |
| DE | 102017215708 A1 * | 3/2019 | |
| DE | 102018118215 A1 | 1/2020 | ............ B60W 40/02 |
| EP | 2113746 B1 | 11/2009 | ............ G01C 21/32 |
| WO | 2018/126083 A1 | 7/2018 | ............. G01C 21/00 |

OTHER PUBLICATIONS

Machine translation of DE-102017215708-A1 (Year: 2019).*
German Office Action, Application No. 102020210515.4, 7 pages.
Chinese Office Action, Application No. 202110953299.2, 16 pages.

* cited by examiner

METHOD FOR CHECKING DETECTED CHANGES TO AN ENVIRONMENTAL MODEL OF A DIGITAL AREA MAP

CROSS-REFERENCE TO RELATED APPLICATIONS

This application claims priority to German Patent Application No. DE 10 2020 210 515.4, filed on Aug. 19, 2020 with the German Patent and Trademark Office. The contents of the aforesaid Patent Application are incorporated herein for all purposes.

TECHNICAL FIELD

The present invention relates to a method for checking detected changes to an environmental model of a digital area map that for example can be used to prevent incorrect changes to the environmental model, and to optimize the recognition of changes by vehicle environment sensors.

BACKGROUND

This background section is provided for the purpose of generally describing the context of the disclosure. Work of the presently named inventor(s), to the extent the work is described in this background section, as well as aspects of the description that may not otherwise qualify as prior art at the time of filing, are neither expressly nor impliedly admitted as prior art against the present disclosure.

Currently, a plurality of assistance systems are used in motor vehicles to enable improved comfort and greater safety when driving the vehicle in road traffic, for example for the driver. To accomplish this, sensors are installed in the vehicle to monitor the vehicle's environment, for example one or more video cameras or sensors based on ultrasound, radar or laser. Evaluating the data from these sensors makes it possible to recognize a wide range of information on static and moving objects and structures in the vehicle's environment as well as structural boundaries of the roadway, and to compile this information into a model of the environment.

Such environmental models may be very important for example for autonomous, or respectively highly automated driving since positioning that is only based on current satellite positioning systems such as GPS and map data for current navigation applications is insufficient for this purpose.

In contrast, environmental models with highly precise digital map models make it possible to very precisely position the vehicle. To accomplish this, distances to landmarks such as traffic signs, road signs, traffic lights, curbs, edges of houses, guardrails and other environmental objects are precisely measured using environmental sensors integrated in the vehicle. Through a comparison with the corresponding reference points noted in a high-resolution map, an autonomously driving vehicle can then be precisely situated.

If a vehicle finds deviations in a comparison of its sensor data with the map data, this individual vehicle can accordingly temporarily learn to correct its digital map. If a large number of vehicles transfer such correction data to a central server, this data can be centrally evaluated and learned, wherein the learned map changes can then be provided to all vehicles. In this context, the term "self-learning maps" is also used.

SUMMARY

An object exists to provide an improved method for checking detected changes to an environmental model of a digital area map.

The object is solved by the subject matter of the independent claims. Embodiments of the invention are described in the dependent claims, the following description, and the drawings.

DESCRIPTION

Figure 1:
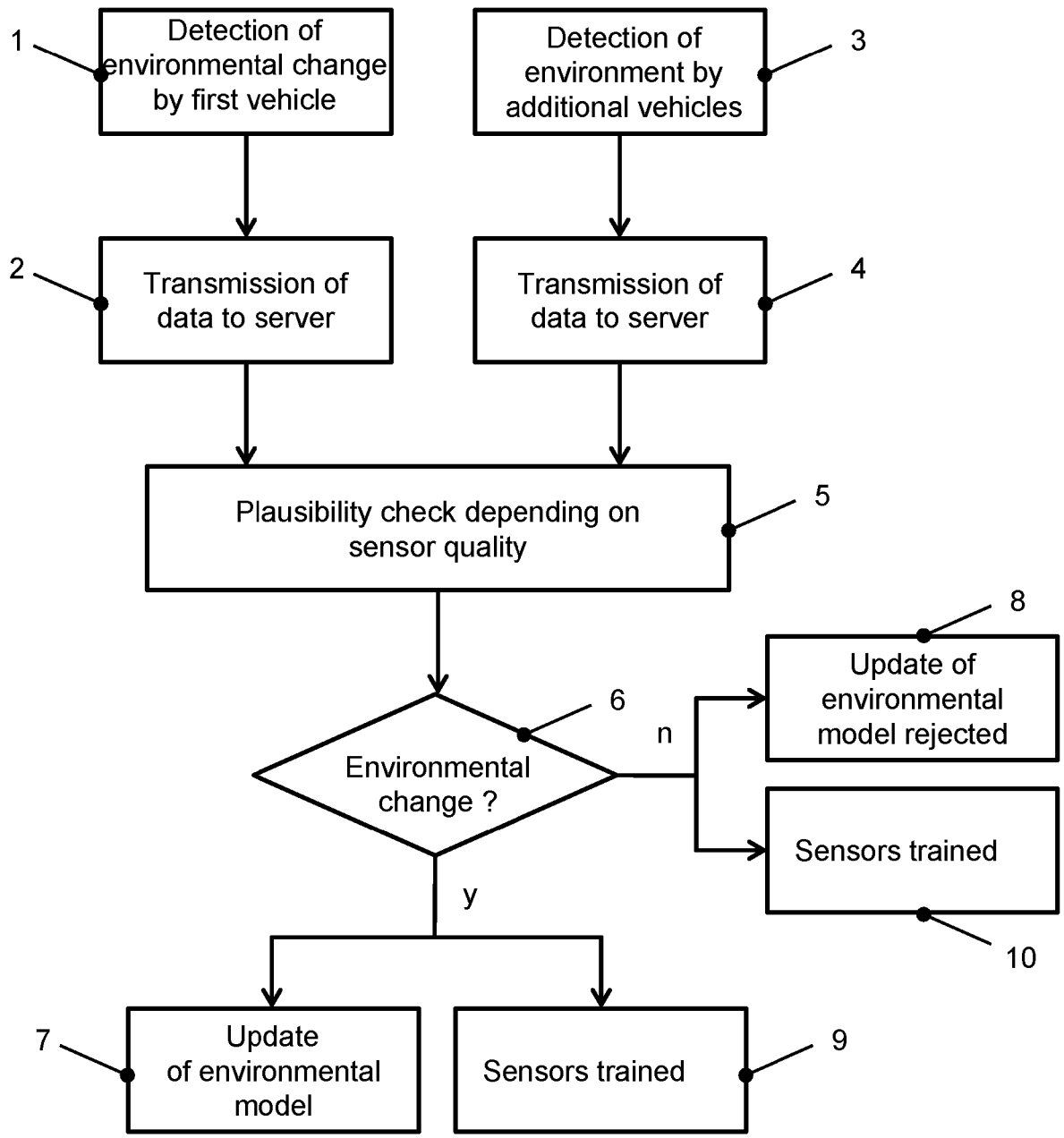
FIG. 1 shows a flowchart of a method according to embodiments.

The details of one or more embodiments are set forth in the accompanying drawings and the description below. Other features will be apparent from the description, drawings, and from the claims.

In the following description of embodiments of the invention, specific details are described in order to provide a thorough understanding of the invention. However, it will be apparent to one of ordinary skill in the art that the invention may be practiced without these specific details. In other instances, well-known features have not been described in detail to avoid unnecessarily complicating the instant description.

For example embodiments are based on the recognition that maximum security must be ensured for fully automated driving and other safety-relevant measures by driver assist systems, and a continuously managed and updated digital environmental model is therefore required. Consequently, on the one hand, updating should occur very quickly once a change in the environmental model has been found. On the other hand, maximum reliability of the environmental model may in some embodiments be extremely important.

In a first exemplary aspect, a method is provided for checking detected changes in an environmental model of a digital area map, a first vehicle with a one or more sensors detects a change in the environment from an environmental model of a digital area map. Data from the first vehicle is transferred to a central server, wherein the data includes information on the detected environmental change, position data of the detected environmental change, and information by means of which the sensor quality of the one or more sensors can be ascertained. Depending on the sensor quality of the one or more sensors, the central server performs a plausibility check of the detected environmental change by using data that are detected by a one or more sensors of another vehicle and transferred to the central server.

It is noted that herein, the terms 'one or more sensors' and 'sensor arrangement' are used interchangeably.

In this way, it can be provided that an incorrect change to the environmental model in the digital map from (environmental) sensors that are outdated or imprecise due to their design is avoided.

For example in this context, the sensor quality offers a measure of the reliability of the recognition of objects and/or structures in the environment of the particular vehicle and/or changes to the objects and/or structures.

For example in this context, the one or more sensors may comprise (a set of) environmental sensors.

In some embodiments, a plausibility check is performed when the sensor quality of the one or more sensors of the first vehicle falls below a predefined value.

In some embodiments, a plausibility check is performed of the data from the first vehicle that has one or more sensors with a first sensor quality in that at least one additional vehicle which has one or more sensors with a sensor quality better than the first sensor quality checks the change in the environment detected by the first vehicle.

In this case, it is beneficial when at least one vehicle with a one or more sensors with a maximum sensor quality is sent by the central server to the position of the detected environmental change for the plausibility check of the detected environmental change.

For example, if there is a positive result of the plausibility check, the digital area map is updated; if there is a negative result of the plausibility check, an update of the digital area map is in contrast rejected.

For example when there is a positive result of the plausibility check, information on the positive result of the plausibility check is transmitted by the central server to vehicles with sensor arrangements that did not recognize the change in the environment, and the sensor data processing is modified for these sensor arrangements such that comparable environmental changes may be subsequently recognized.

Also when there is a negative result of the plausibility check and in some embodiments, information on the negative result of the plausibility check is transmitted by the central server to vehicles with sensor arrangements that recognized a change in the environment, and the sensor data processing is modified for these sensor arrangements such that an environmental change will subsequently not be recognized under the same conditions.

The invention also concerns a central server that is configured to execute the method of the first exemplary aspect or any of its embodiments.

In order to better understand the principles of the present invention, further embodiments are explained in greater detail below based on the FIGS. It should be understood that the invention is not limited to these embodiments and that the features described can also be combined or modified without departing from the scope as defined in the claims.

Specific references to components, process steps, and other elements are not intended to be limiting. Further, it is understood that like parts bear the same or similar reference numerals when referring to alternate FIGS. It is further noted that the FIGS. are schematic and provided for guidance to the skilled reader and are not necessarily drawn to scale. Rather, the various drawing scales, aspect ratios, and numbers of components shown in the FIGS. may be purposely distorted to make certain features or relationships easier to understand.

FIG. 1 shows a flowchart of a method according to the embodiments. In a first method step 1, a first vehicle with a one or more sensors detects an environmental change from an environmental model of a digital area map. In this case, the one or more sensors comprise at least one environmental sensor, for example however, a set of environmental sensors.

The digital area map, hereinafter also termed a basic map, contains in this regard a detailed environmental model of the real geographic conditions. Accordingly, for example, road information such as street names, lane widths, the number of lanes, road markers or road boundaries and a wide range of landmarks such as traffic signs, street signs, traffic lights, curbs, the edges of houses, guardrails and other environmental objects are noted. Very precise position information of the landmarks is saved.

To detect the environmental change, landmarks are recorded with environmental sensors integrated in the vehicle and compared with landmarks contained in the digital area map. A change in this context can indicate that a landmark contained in the digital area map is not recorded, both because this landmark no longer exists at this position, or environmental sensors of the vehicle do not record an existing landmark. Likewise, a landmark that is not yet contained in the digital area map can also be recorded for the first time. Moreover, a change in the environment can result because nothing has changed in terms of the existence of a landmark, but features, or respectively attributes assigned to this landmark, have changed.

This detection of the environmental change can for example occur while the vehicle is driving on a route. Since, given the high resolution and the number of contained environmental objects, the amount of data for a very precise digital model of the surroundings is too large to maintain the map data for the complete road network locally in the vehicle, the digital environmental data needed in the vehicle for the current road section is downloaded from a central database to the vehicle by a mobile communications link. To accomplish this, the vehicle can determine its current position data for example with a satellite-supported navigation system such as the GPS system.

In this case, the central database can be provided in a central server/backend server that is connected to a plurality of vehicles of a vehicle fleet or a vehicle swarm. The central server in this case can also be part of an IT infrastructure, which will not be described here in greater detail, such as for example a so-called cloud in which a plurality of servers or server farms are connected to each other, if applicable at geographically distributed locations.

In a method step 2, data are then transferred from the first vehicle to the central server, wherein this transference can also for example occur via a mobile communications network.

The transferred data comprise information on the detected environmental change. Accordingly for example, it may be transmitted that a landmark provided in the digital map no longer exists. When a new landmark has been recognized, one or more attributes of the newly recognized landmark are transferred in addition to the information on the existence of this landmark. The attributes that can be transmitted depend in this case for example on the environmental sensors of the vehicle with which this new landmark was recognized. Accordingly for example, changes to the lettering of a road or traffic sign can only be recognized visually by a camera and then transmitted. In this case, the image content can already be evaluated and abstracted in the vehicle; it is however also possible to transmit the recorded camera image to the central server for evaluation via the mobile communications datalink. The same holds true when a change to at least one attribute of a landmark is recognized by the vehicle.

If applicable, time-related parameters such as the time, the date, and/or the day of the week can also be taken into account. To accomplish this, it can be provided to provide the information on the detected environmental change with a timestamp and also to take this into account in the evaluation.

Moreover, position data of the detected environmental change are determined from the current vehicle position and the relative position of the landmark with respect to the vehicle. These position data are transmitted to the central server in order to be able to clearly identify the affected landmark, or respectively situate it in the digital map. The position data in this case are for example available as geographic coordinates, wherein different notations are possible.

Furthermore, information is transferred by means of which the sensor quality of the environmental sensors, that indicates a measure of the reliability of the recognition of landmarks in the vehicle's environment and changes to these landmarks, can be determined. Accordingly for example information on the vehicle, for example the vehicle manufacturer and vehicle type, or the vehicle identification number of the vehicle can be transmitted. In a database in which the sensor quality of the environmental sensors used in the particular vehicle is noted for this vehicle information, the relevant sensor quality can then be queried and used for the subsequent method. Likewise, information on the environmental sensors installed in the vehicle, such as a product name or part number, can be transmitted that in turn makes it possible to determine the sensor quality through corresponding information in a database. Finally, an index of the sensor quality can also be transferred directly.

Based on the transferred data, the central server performs a plausibility check in a method step 5 of the detected environmental change depending on the sensor quality in order to thereby reduce uncertainties about the validity of the detected environmental changes. To accomplish this, the central server accesses data that were determined in a method step 3 by at least one additional vehicle after a recording of the same environmental region by the environmental sensors of this additional vehicle and were transferred to the central server in a method step 4.

Whether the central server performs a plausibility check here can be made dependent on a variety of parameters. Accordingly, a plausibility check may, e.g., always occur when the sensor quality of the one or more sensors of the first vehicle falls below a predefined value, or the environmental sensors of the one or more sensors belong to an outdated device generation, and vehicles with newer sensor generations are also being used. Likewise, such a plausibility check can occur when different information on a potential change of the environmental model are transmitted by different vehicles with older sensor generations.

The plausibility check can occur here in that at least one additional vehicle, that has one or more sensors with a better sensor quality than the sensor quality of the first vehicle, checks the environmental change detected by the first vehicle. In order to maximize the reliability of the plausibility check, for example a reference vehicle with one or more sensors having a maximum sensor quality performs a check. The check in this case can be by a reference vehicle that soon travels the same route and passes the position with the reported environmental change; likewise, the reference vehicle may however also be intentionally sent by the central server to the position of the detected environmental change.

Depending on the results of the plausibility check that is determined in a method step 6, the central server can then pursue various measures.

Accordingly on the one hand, an update of the digital area map can be made dependent on the result of the plausibility check. An update in a method step 7 only occurs when there is a positive result of the plausibility check; when there is a negative result, an update of the digital area map is contrastingly rejected in a method step 8.

Likewise, the result of the plausibility check can also be used to optimize the one or more sensors installed in the vehicles. Accordingly when there is a positive result of the plausibility check, information on the positive result of the plausibility check can be transferred to vehicles with one or more sensors that have not recognized the environmental change in order to modify the sensor data processing in these one or more sensors in a method step 9, and to improve the recognition rate of comparable environmental changes in the future. Accordingly for example, an evaluation algorithm for the sensor data of an environmental sensor can be correspondingly adapted.

Likewise when there is a negative result of the plausibility check, information in this regard can be transferred to vehicles with one or more sensors that have incorrectly recognized an environmental change, and the sensor data processing can be modified for these one or more sensors in a method step 10 such that an environmental change is subsequently not recognized under equivalent conditions.

Figure 2:
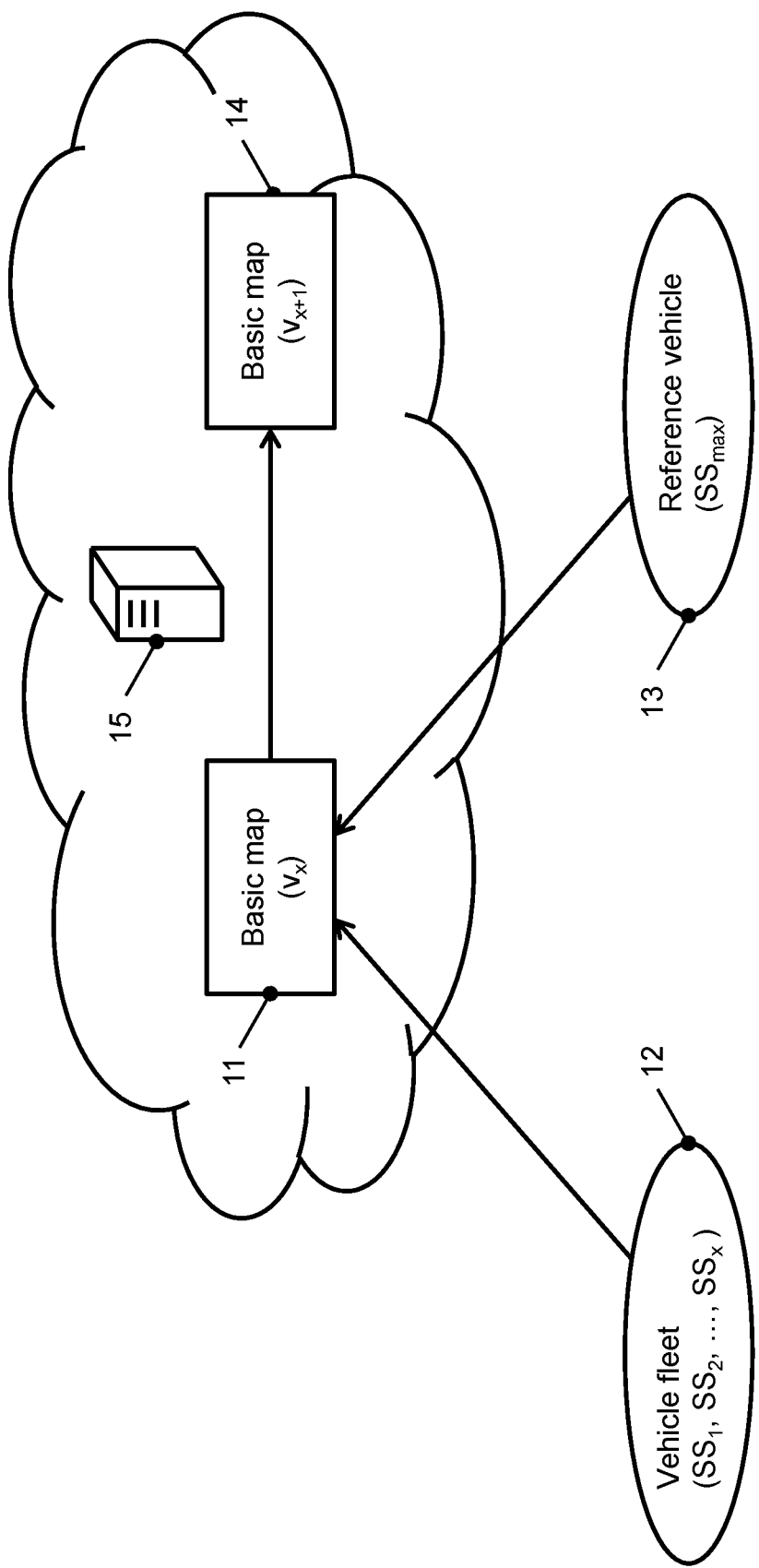
FIG. 2 schematically shows an overview of an update of the digital map data of a basic map according to embodiments.

A schematic overview of an update of the digital map data of a basic map is shown in FIG. 2. At a certain time, a basic map 11 of version $V_x$ is present in a central server 15. A vehicle fleet consists of a large number of different vehicles that are each equipped with a set of environmental sensors, hereinafter described as sensor sets $SS_1, SS_2, \ldots, SS_x$. The different sensor sets $SS_1, SS_2, \ldots, SS_x$ have different sensor qualities that for example depend here on the age of the vehicles or also the type of the vehicles.

The vehicles of the vehicle fleet 12 collect a plurality of data on the particular environment with their sensor sets. If a change in the environmental model is recorded by a vehicle with a sensor set of a certain sensor quality, information on this is transmitted to the central server as described above. If for example a potential change is only recognized by a sensor set $SS_1$ of a certain sensor quality, but not by other sensor sets $SS_2$-$SS_x$, there is first a comparison of the sensor data recorded by a reference vehicle 13 with the sensor set $SS_{max}$ with corresponding environmental data in the basic map 11 of version $V_x$. If the change recognized by the sensor set $SS_1$ is validated by the reference vehicle 13, the basic map is updated after this validation, and a new basic map 14 of version $V_{x+1}$ is published and can be subsequently used by driver assist systems of the vehicles.

Figure 3:
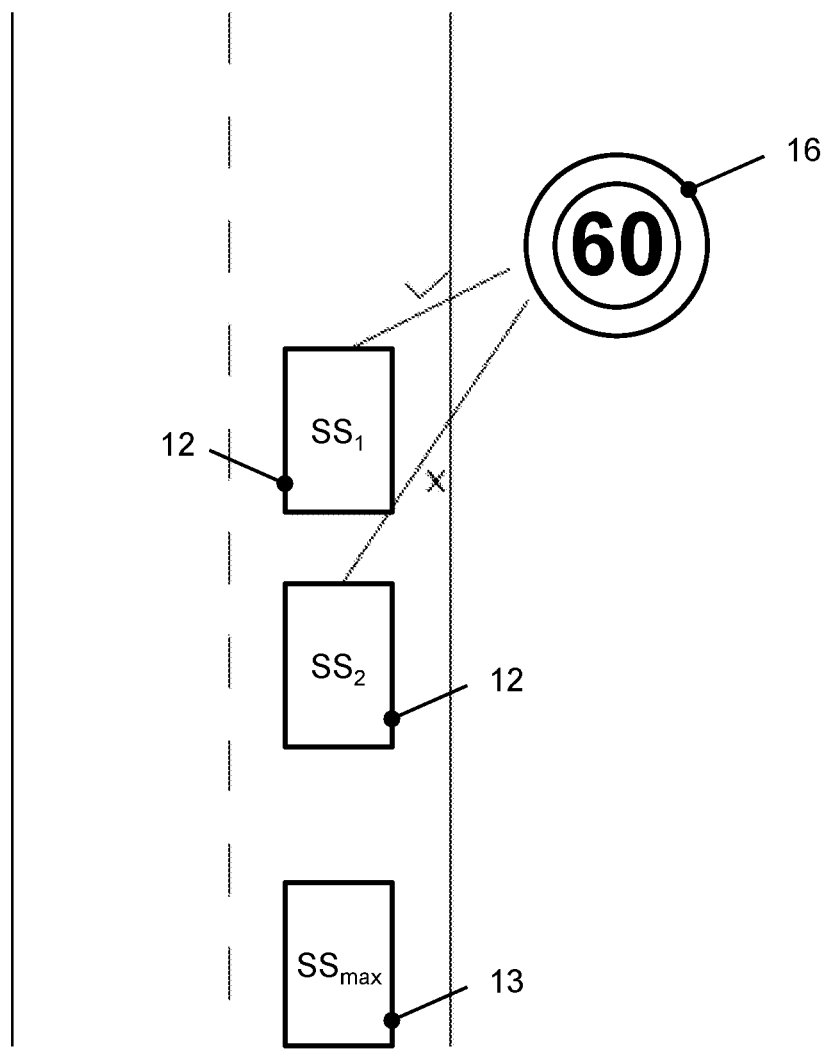
FIG. 3 schematically shows an example with a changed traffic sign with several vehicles having sensors of varying sensor quality, and a reference vehicle.

An example of such a scenario is shown in FIG. 3 in which several vehicles are driving on the road in the same direction. The vehicles in this case are connected to a central server, not shown, wherein the communication between the particular vehicle and the central server is in this case via a wireless communications datalink, such as by means of mobile communications units provided in the vehicles.

A first vehicle of the vehicle fleet 12 finds that its current vehicle environment as perceived by its sensor set $SS_1$ no longer corresponds with the information that is contained in the basic map. In the shown example, a traffic sign 16 with a speed limit of 60 km/h is for example recognized with the sensor set $SS_1$, for example with an outside camera facing forward in the driving direction. Through a comparison with the digital map data from the basic map, the vehicle determines that there is already a landmark in the form of a traffic sign at the geoposition in the current basic map. However, an attribute is noted in the basic map that this traffic sign specifies a speed limit of 70 km/h. Then this vehicle reports to the central server that there is apparently a change here in the environmental model, and that there is a speed limit of 60 km/h instead of a speed limit of 70 km/h.

In this case, information on the vehicle, or respectively the sensor set of the vehicle, are also transmitted to the central server. Since incorrect detections can occur, the central server first waits in this case until there are other reports of a detection of the change in the environment, in this case the reduction of the speed limit, before a change in the basic map is initiated. Accordingly in the shown example, an additional vehicle of the vehicle fleet with a sensor set $SS_2$ following the first vehicle does not recognize the traffic sign, or respectively the change. For example, the sensor set $SS_2$ can also have an outside camera that is, however, outdated and therefore does not provide unambiguous data in poor lighting conditions. Since contradictory statements exist in this case, a reference vehicle 13 with a sensor set $SS_{max}$ with maximum sensor quality is directed to the relevant location to validate which sensor set reflects reality and which may need an update.

In the shown example, the reference vehicle reports that a change actually exists. Consequently, the sensor set $SS_2$ has a malfunction, and something in the algorithm for image recognition may have to be adapted. Corresponding information can then be transmitted to vehicles that are equipped with such a sensor set $SS_2$. Moreover, the recognized change is incorporated in the basic map following the validation by the reference vehicle.

Likewise, it can be determined from the check by the reference vehicle if a change is being reported by a malfunction even though such a change does not exist. In this case as well, an optimization of the relevant sensor set can be initiated. If an older sensor set cannot be retrained in this case, the result of the check can still be used, for example by ignoring future change messages from such sensor sets in the event of comparable environmental parameters, or respectively landmarks.

LIST OF REFERENCE NUMERALS 1-10 Method steps
11 Basic map
12 Vehicle fleet
13 Reference vehicle
14 Updated basic map
15 Server
16 Traffic sign
$SS_1, SS_2, \ldots, SS_x$ Sensor sets The invention has been described in the preceding using various exemplary embodiments. Other variations to the disclosed embodiments may be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. A single processor, module or other unit or device may fulfil the functions of several items recited in the claims.

The term "exemplary" used throughout the specification means "serving as an example, instance, or exemplification" and does not mean "preferred" or "having advantages" over other embodiments.

The mere fact that certain measures are recited in mutually different dependent claims or embodiments does not indicate that a combination of these measures cannot be used to advantage. Any reference signs in the claims should not be construed as limiting the scope.

What is claimed is:

1. A method for verifying detected changes to an environmental model of a high precision digital area map for autonomous or highly automated driving, comprising:
    obtaining, by one or more environmental image sensors of a first vehicle, environmental image data;
    detecting, using image processing of the environmental image data, at least one landmark in an environment of the first vehicle;
    determining a relative position of the at least one landmark relative to the first vehicle;
    calculating, using signals, received by a global navigation satellite system (GNSS) receiver of the first vehicle, a current absolute position of the first vehicle;
    querying, by the first vehicle, a central database for digital environmental data, wherein the digital environmental data is an excerpt from the environmental model based on the determined current position of the first vehicle;
    obtaining, by the first vehicle, the digital environmental data over a data connection;
    comparing, by the first vehicle, the detected at least one landmark with one or more landmarks comprised in the digital environmental data;
    determining, by the first vehicle, whether an environmental change is present with respect to the at least one landmark based on the comparing;
    transferring data from the first vehicle to a central server, wherein the data includes information on the environmental change, position data of the at least one landmark, and sensor quality data of the one or more environmental image sensors, wherein the sensor quality data is a quality measure of the one or more environmental image sensors;
    depending on the sensor quality data of the one or more environmental image sensors of the first vehicle, selectively performing, by the central server, a plausibility check of the detected environmental change using additional data that are detected by one or more image sensors of an additional vehicle, different from the first vehicle;
    depending on the sensor quality data of the one or more environmental image sensors and the plausibility check, selectively updating, by the central server, the high precision digital area map;
    publishing the high precision digital area map; and
    using the published high precision digital area map by a driver assist system of a second vehicle to precisely position the second vehicle.

2. The method of claim 1, wherein the sensor quality data indicates a measure of the reliability of the recognition of objects and/or structures in the environment of the particular vehicle, and/or the changes to the objects and/or structures.

3. The method of claim 2, further comprising performing the plausibility check when a sensor quality of the one or more environmental image sensors of the first vehicle is below a predefined value.

4. The method of claim 2, wherein the one or more image sensors of the additional vehicle have a sensor quality better than a sensor quality of the one or more environmental image sensors of the first vehicle, and wherein the plausibility check comprises checking, by the additional vehicle, the environmental change determined by the first vehicle.

5. The method of claim 2, wherein in case of a positive result of the plausibility check, the high precision digital area map is updated, and in case of a negative result of the plausibility check, an update of the high precision digital area map is rejected.

6. The method of claim 1, further comprising performing the plausibility check when a sensor quality of the one or more environmental image sensors of the first vehicle is below a predefined value.

7. The method of claim 6, wherein the one or more image sensors of the additional vehicle have a sensor quality better than the sensor quality of the one or more environmental image sensors of the first vehicle, and wherein the plausibility check comprises checking, by the additional vehicle, the environmental change determined by the first vehicle.

8. The method of claim 6, wherein in case of a positive result of the plausibility check, the high precision digital area map is updated, and in case of a negative result of the plausibility check, an update of the high precision digital area map is rejected.

9. The method of claim 1, wherein the one or more image sensors of the additional vehicle have a sensor quality better than a sensor quality of the one or more environmental image sensors of the first vehicle, and wherein the plausibility check comprises checking, by the additional vehicle, the environmental change determined by the first vehicle.

10. The method of claim 9, wherein the central server sends the additional vehicle to the position of the detected environmental change to check the plausibility of the detected environmental change.

11. The method of claim 9, wherein in case of a positive result of the plausibility check, the high precision digital area map is updated, and in case of a negative result of the plausibility check, an update of the high precision digital area map is rejected.

12. The method of claim 1, wherein in case of a positive result of the plausibility check, the high precision digital area map is updated, and in case of a negative result of the plausibility check, an update of the high precision digital area map is rejected.

13. The method of claim 1, wherein in case of a positive result of the plausibility check, information on the positive result of the plausibility check is transmitted by the central server to vehicles with one or more image sensors that did not recognize the environmental change, and a sensor data processing setting is modified for the one or more image sensors such that comparable environmental changes are subsequently recognized.

14. The method of claim 1, wherein in case of a negative result of the plausibility check, information on the negative result of the plausibility check is transmitted by the central server to vehicles with one or more image sensors that recognized the environmental change, and a sensor data processing setting is modified for the one or more image sensors such that the environmental change is subsequently not recognized under the same conditions.

15. A central server, configured to execute a method for verifying detected changes to an environmental model of a high precision digital area map for autonomous or highly automated driving, comprising:
receiving data from a first vehicle, wherein the data includes information on a detected environmental change, position data of at least one landmark, and sensor quality data of one or more environmental image sensors of the first vehicle, wherein the sensor quality data is a quality measure of the one or more environmental image sensors;
depending on the sensor quality data of the one or more environmental image sensors of the first vehicle, selectively performing a plausibility check of the detected environmental change, comprising:
determining at least one additional vehicle from a plurality of vehicles, wherein the at least one additional vehicle has travelled or is going to travel to a vicinity of the detected environmental change;
obtaining additional data from the at least one additional vehicle, wherein the additional data covers the vicinity of the detected environmental change; and
verifying, using the additional data, the detected environmental change;
depending on the sensor quality data and the plausibility check, selectively updating, by the central server, the high precision digital area map;
publishing the high precision digital area map; and
using the published high precision digital area map by a driver assist system of a second vehicle to precisely position the second vehicle.

16. A method for determining changes to an environmental model of a high precision digital area map for autonomous or highly automated driving, comprising:
obtaining, by one or more environmental image sensors of a first vehicle, environmental image data;
detecting, using image processing of the environmental image data, at least one landmark in an environment of the first vehicle;
determining a relative position of the at least one landmark relative to the first vehicle;
calculating, using signals, received by a global navigation satellite system (GNSS) receiver of the first vehicle, a current absolute position of the first vehicle;
querying, by the first vehicle, a central database for digital environmental data, wherein the digital environmental data is an excerpt from the environmental model based on the determined current position of the first vehicle;
obtaining, by the first vehicle, the digital environmental data over a data connection;
comparing, by the first vehicle, the detected at least one landmark with one or more landmarks comprised in the digital environmental data;
determining, by the first vehicle, whether an environmental change is present with respect to the at least one landmark based on the comparing;
transferring data from the first vehicle to a server, wherein the data includes information on the environmental change, position data of the at least one landmark, and sensor quality data of the one or more environmental image sensors, wherein the sensor quality data is a quality measure of the one or more environmental image sensors;
depending on the sensor quality data of the one or more environmental image sensors of the first vehicle, selectively performing, by the server, a plausibility check of the detected environmental change;
depending on the sensor quality data of the one or more environmental image sensors and the plausibility check, selectively updating, by the server, the high precision digital area map;
publishing the high precision digital area map; and
using the published high precision digital area map by a driver assist system of a second vehicle to precisely position the second vehicle.

* * * * *